March 5, 1963  F. KUHRT  3,080,550
MAGNETIC DATA PROCESSING APPARATUS
Filed Feb. 18, 1960  2 Sheets-Sheet 1
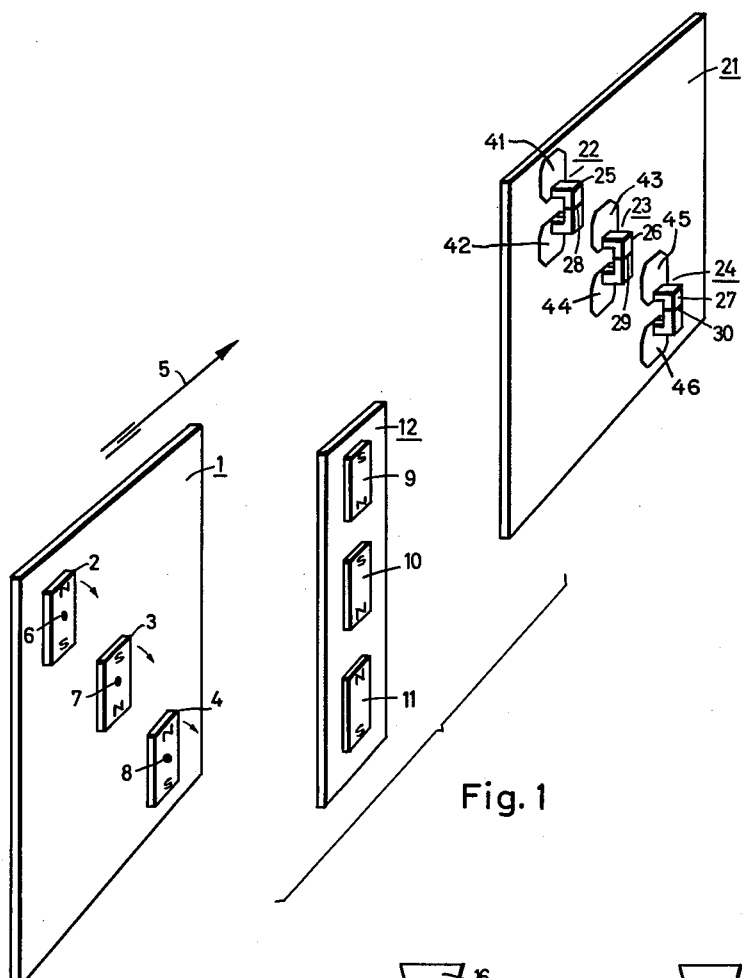
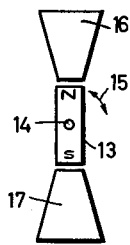
Fig. 2
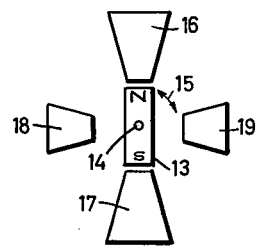
Fig. 3

March 5, 1963  F. KUHRT  3,080,550
MAGNETIC DATA PROCESSING APPARATUS
Filed Feb. 18, 1960  2 Sheets-Sheet 2

United States Patent Office 3,080,550
Patented Mar. 5, 1963

3,080,550
MAGNETIC DATA PROCESSING APPARATUS
Friedrich Kuhrt, Nurnberg, Germany, assignor to Siemens-Schuckertwerke Aktiengesellschaft, Berlin-Siemensstadt, Germany, a corporation of Germany
Filed Feb. 18, 1960, Ser. No. 9,542
Claims priority, application Germany Feb. 19, 1959
5 Claims. (Cl. 340—174)

My invention relates to the storing, transmitting and reproducing of signals by magnetic means.

Data can be stored and transmitted with the aid of magnetizable data carriers on which the individual data are recorded by permanent magnetism of selected orientation. For this purpose, one or more permanent magnets may be provided, particularly a matrix group of such magnets whose respective magnetic orientations are selected from magnet to magnet so as to form a number of different data differing from each other by a different combination of the magnetic orientations within the group of magnets.

In the simplest case, two main directions of orientation are sufficient so that two different signals can be stored and transmitted with the aid of but a single permanent magnet or, generally, by means of a single magnetization, such as producible, for example, on magnetic recording tape. When, in lieu of a single permanent magnet, a group of such magnets is used, numerous code combinations are available for designating respectively different signals.

In principle, such magnetic devices comprise a transmitter which serves for storing the signals to be transmitted and which accordingly must be provided with magnetizations that do not appreciably change during prolonged periods of time as regards direction and magnitude of the magnetic fields. Also required is a receiver with magnetic sensing members or transducers whose spacial arrangement corresponds substantially to the spacial distribution of the magnetizations in the transmitter. As regards the arrangement of the sensing transducers, the receiver preferably is a congruent image of the magnet arrangement in the transmitter. The transducers in the receiver translate the magnetizations of the transmitter into electric voltages or currents to be supplied to the data utilizing equipment.

It has been proposed to provide a receiving device for sensing magnetically stored signals with transducers of the Hall-voltage generating type. Such a Hall-voltage generator comprises a semiconductor wafer, called "Hall plate," which is provided with two current-supply terminals and with two probe electrodes, called "Hall electrodes," located midway between the two terminals. When a current passes through the Hall plate between the terminals while the Hall plate is acted upon by a magnetic field, an output voltage, called "Hall voltage," occurs between the Hall electrodes. When a constant control current passes through the plate, the Hall voltage is proportional to the intensity of the magnetic field. In comparison with electro-inductive sensing devices often employed for reproducing magnetic signals, for example in magnetic tape recorders, the above-described Hall-voltage generators have the advantage that their electric output, corresponding to the magnetization being sensed, is not dependent upon the existence and speed of relative travel motion between transmitter and receiver and that such generators may even afford a satisfactory signal transmission with transmitter and receiver at standstill relative to each other.

In lieu of Hall-voltage generators, other sensing devices of the magnetostatic type can be used in the receiver. It is known, for example, to employ electronic tubes in which an electron beam is deflected in dependence upon a magnetic field and thus varies the share of the electron current passing onto one or the other of two collector electrodes. It is further possible to operate with inductive reproducer heads by superimposing thereupon an alternating-current of a given carrier frequency and utilizing in known manner the influence imposed upon the alternating current under the magnetic field effect of the magnetic signals acting in the sense of a premagnetization. This, however, requires additional devices which not only indicate the presence of a magnetization but also respond differently to respectively different directions of magnetization.

If a transmission of magnetic signals on the principles described above involves a voluminous signal content comprising, for example, numerals from 1 to 100 or similarly numerous distinctive data, a matrix arrangement of permanent magnets of respectively selected directions of magnetization may be used as a transmitter, and a corresponding, preferably congruent, group of sensing heads with Hall-voltage generators may be used as receiver. In such cases it is often necessary to change the intelligence content of the transmitter. Such change heretofore required controlling the group of permanent magnets in such a manner as to reversely magnetize one or more of these magnets. The necessary de-magnetization and reverse magnetization demands an appreciable amount of magnetizing power and hence imposes corresponding requirements upon the auxiliary equipment needed. Thus, for example, it is necessary in most cases to place reversely magnetizing, comparatively powerful magnets upon those permanent magnets that form part of the transmitter proper. In general, such re-magnetizing work must be done with a congruent group of accessory electromagnets or permanent magnets of greater coercive force than the transmitter magnets proper. Furthermore, the magnetic signal content of the permanent-magnet matrix in the transmitter proper can be changed only with difficulty, or not with sufficient reliability in equipment that requires a travel motion of the signal transmitter relative to the receiver.

It is an object of my invention to eliminate the above-mentioned disadvantages.

According to my invention, relating to a magnetic data processing apparatus of the general type described above, the permanent magnets in the data storing transmitter unit are designed as rotationally mounted bodies, and a change in magnetic orientation is effected by changing their rotational position with the aid of permanent magnets or electromagnets placed in the vicinity of the rotatable bodies but not in bodily contact therewith. To facilitate turning the permanent magnets for the purpose of changing their direction of magnetic orientation, it is preferable to pivot these magnets on their gravity center so that a minimum of turning forces is sufficient. With such a device the permanent magnets can be made to occupy selectively two or more preferential positions. A set of electromagnets or permanent magnets for entering the new data into the group of rotatable magnets permits establishing any desired new orientation without mechanical contact and across a relatively large distance.

Aside from the advantage of entering new data by re-magnetization without contact engagement, the invention excels the above-described known methods of re-magnetization in that the transmitter or data storing unit to be provided with new information need not be stationary when the new data are being entered but may receive its new information while traveling past a stationary data entering unit consisting merely of a group of electromagnets or permanent magnets of suitable arrangement.

The preferential positions of the rotatable permanent magnet bodies can be retained by mechanical catches or the like arresting devices. For this purpose, suitable spring catches may be used, or gravity may be utilized for retaining each magnet in some or all preferential positions. This can be done, for example, by rotatably pivotally mounting the permanent magnet bodies outside of their gravity axis so that, with the aid of a suitable mechanism, two or more axes of rotation can be made effective.

According to another, preferred feature of the invention, the mechanical arresting or a similar snap-in action of the rotatable magnets is achieved by employing a magnetic return force tending to keep the permanent magnet in the desired preferential positions. This is done, according to another feature of the invention, by using pole shoes of magnetically soft (magnetizable) material mounted in fixed positions and magnetically acted upon by the rotatable magnets to hold these magnets in the desired preferential positions.

The foregoing and other objects, advantages and features of the invention will be apparent from, and will be described in, the following with reference to the embodiments of devices according to the invention illustrated by way of example on the accompanying drawing in which:

FIG. 1 shows schematically a magnetic-data processing apparatus comprising a data entering unit, a data storing unit, and a data reproducing unit, the storing unit being displaceable past the stationary entering unit and relative to the stationary reproducing unit.

FIG. 2 illustrates schematically an individual rotatable magnet with two fixed pole shoes for securing the magnet in given preferential positions.

FIG. 3 illustrates a rotatable magnet with two pairs of fixed pole shoes for securing the magnet in main positions and intermediate positions respectively.

Figure 4:
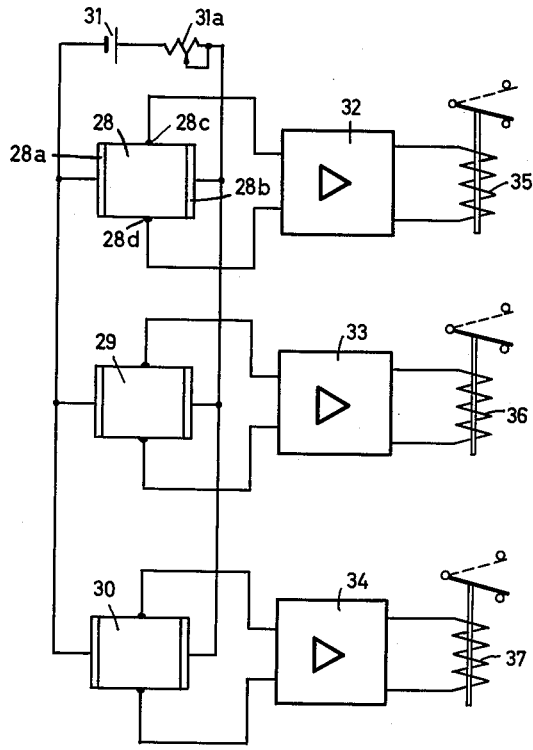
FIG. 4 illustrates schematically the circuit diagram of the reproducing unit.

According to FIG. 1, the data-storing transmitter unit comprises a panel 1 on which a group of permanent magnets 2, 3, 4 are mounted for rotation about respective pivots 6, 7, 8 located on the gravity axes of the magnet bodies. It will be understood that while only three magnets are shown, any desired number of magnets may be provided. For example, five magnets will permit memorizing and transmitting signals in accordance with the conventional five-unit code. The data storing unit 1 is displaceable in a direction indicated by an arrow 5. It will be understood that the illustrated apparatus may form part of a computer, business machine or machine-tool control system in which the data storing unit will periodically travel past the data entering unit and the data reproducing unit, the latter two units being stationarily mounted.

The data entering unit comprises a panel 12 on which three permanent magnets 9, 10, 11 are mounted, the number of magnets, of course, being equal to the number of rotatable magnets in the storing unit. The magnets 9, 10 and 11 have prescribed directions of magnetic orientation as required for the particular information or code character to be entered in the storer unit 1. The spacing between the panel 1 and the panel 12 with the stationary magnets 9, 10, 11 may amount to a few centimeters when the storer unit, on its travel, is located opposite the data entering unit. The entering of the information on the storing unit takes place without mechanical contact, nor is it necessary for the storer unit to stop on its travel.

The data reproducing unit comprises a panel 21 on which a number, in the present case three, sensing heads of the Hall-voltage generating type are mounted. The receiving, date reproducing unit is provided with a panel 21 on which three transducer heads 22, 23, 24 are firmly mounted in a grouping corresponding to that of the permanent magnets of the data entering unit. Each transducer head comprises a U-shaped magnetizable yoke 25, 26 or 27, each having a field gap. Located in each gap is a semiconducting Hall plate 28, 29 or 30. Mounted on the front faces of the U-shaped yokes are respective pairs of magnetizable pole shoes consisting of relatively large sheet-metal members 41, and 42, 43 and 44, 45 and 46. The design and operation of the illustrated Hall-voltage generating transducer is in accordance with the transducers illustrated and more fully described in the copending application Serial No. 833,185, filed August 12, 1959, assigned to the assignee of the present invention.

Each Hall plate 28, 29, 30 consists of a thin layer or wafer of semiconducting crystalline material such as indium arsenide or indium antimonide. The Hall plate is of rectangular shape and has two metallic current supply terminals extending along to opposite edges of the rectangular wafer, such as the electrodes denoted by 28a and 28b in FIG. 4. Each Hall plate is further provided with two probe-type Hall electrodes located on the two other rectangle sides mid-way between the two terminals, such as the Hall electrodes denoted by 28c and 28d. The current supply terminals of all Hall electrodes are energized by current supplied from a current source 31 preferably through a current-adjusting rheostat 31a. The energizing current may be a direct current of normally constant voltage, or an alternating current of a given frequency and constant voltage amplitude. When the magnetizable yoke is not subjected to the field of one of the permanent magnets of the data storing unit, the two Hall electrodes of each Hall plate have the same potential so that no output voltage is issued. However, when a permanent magnet of the traveling storer unit approaches the corresponding transducer of the reproducing unit, a corresponding magnetic field becomes active in the field gap in which the Hall plate is located. This has the effect of causing a Hall voltage to appear between the Hall electrodes of the Hall plate. The polarity of this voltage, or the instantaneous polarity in the case of alternating current, depends upon the magnetic orientation of the particular permanent magnet 2, 3 or 4 then in the vicinity of the transducers 22, 23 or 24. When the particular permanent magnet occupies a neutral position, i.e. the horizontal position in the illustrated embodiment, no signal or only an insufficient signal is transmitted to the transducer.

As is apparent from FIG. 4, the Hall voltage from the Hall plates is impressed through respective amplifiers 32, 33, 34 upon respective polarized relays 35, 36, 37. Each relay operates selectively by placing its contact in one of two positions so as to discriminate between the available two main directions of magnetic orientation to which the rotatable permanent magnets of the data storing unit are adjusted. Depending upon the particular combination of the three selected relays that operate at a time, a different code combination of signals and hence respectively different data or groups of information are thus being transmitted and reproduced.

Figure 5:
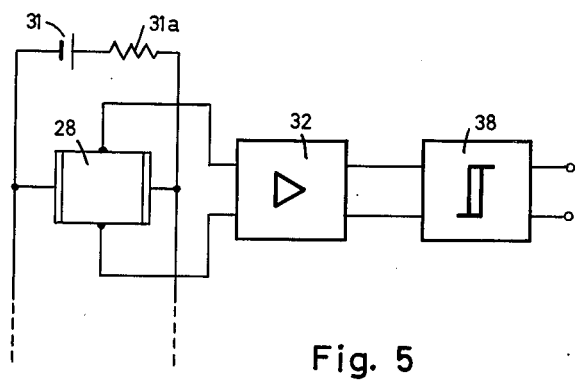
FIG. 5 is a modified circuit diagram of the reproducing unit.

FIG. 5 shows part of the reproducer circuit in somewhat modified form. Instead of a polarized electromagnetic relay, a bistable flip-flop amplifier 38 is connected to the amplifier 32 to furnish an amplified output voltage whose polarity depends upon the magnetic orientation of the signal field.

FIG. 2 illustrates separately a permanent magnet 13 rotatable about a centrally located pivot 14 in accordance with the permanent magnets of the above-described data storing unit. The magnet body 13 is rotatable about pivot 14 in the direction of the arrow 15 and is located between two pole shoes 16 and 17 which are diametrically arranged and fixed to the supporting panel of the unit. The two pole shoes 16 and 17 consist of soft iron or other magnetizable material of high permeability and secure the permanent magnet in one of two fixed preferential positions but permit turning the magnet 13 about a fixed angle of 180° by applying a superior magnetic force as described above.

According to another feature of the invention, a rotation of the permanent magnets over a total angle of 180° is effected in two steps, namely through a preferential intermediate position displaced 90° from the two main positions. This intermediate position would correspond to clearing the corresponding component signal represented by the particular permanent magnet. The resulting advantage is as follows. In the above-described method of impressing and changing magnetic signals by magnetizing, de-magnetizing and reversely magnetizing, there is the possibility of distinguishing between three different types of magnetization, namely a magnetization in the first preferential direction, a magnetization in the second preferential direction, and clearing the magnet by de-magnetization. In contrast thereto, the magnetization of each individual permanent magnet in devices according to the invention is always retained so that the respectively different directions of magnetization are effected only by rotating the permanent magnet to a different position, so that the possibility of an unmagnetic behavior is no longer afforded. However, the non-magnetic condition can nevertheless be simulated by utilizing the above-mentioned feature of an intermediate position between the two main directions of orientation. Consequently, the intermediate position at an angle of 90° to the main directions of orientation, corresponds to clearing the old information before entering the new information into the storing unit.

The modification according to FIG. 3 embodies the just-mentioned features. Two additional pole shoes 19 are mounted in fixed position on the supporting panel of the data storing unit. The common axis of the two pole shoes 18 and 19 extends at an angle of 90° to the axis of the pole shoes 16 and 17, thus defining an intermediate position in which the permanent magnet 13 may be held. As explained, this intermediate position corresponds to clearing the previously stored information before entering a new information into the storing unit.

The magnetic holding force in the intermediate position at an angle of 90° to the two main directions of orientation can be made weaker than the holding force acting in the two main directions. Then, relatively great forces are required for moving the magnet body out of one of its main positions, while relatively small forces are sufficient for rotating it from its "neutral" position to either of the two main positions. This has the desirable result that the entering of new information upon a previously cleared storing unit can be effected with simpler means, whereas the clearing of previously entered information requires a higher expenditure in energy. Consequently, a stronger electromagnet can be used for clearing purposes, whereas the entering of new information is possible while using a considerably weaker permanent magnet.

For the purpose just explained, the pole shoes 18 and 19 have somewhat smaller dimensions than the pole shoes 16 and 17. This has the effect that the entering of new information upon a previously cleared data storing unit can be effected with relatively simple means, for example with the aid of permanent magnets, whereas the clearing of entered information requires a considerably greater force, for example the use of electromagnets.

The data storing unit with its matrix of rotatable permanent magnets, may comprise a flat and completely closed housing of non-magnetic and non-magnetizable material such as metal or plastic. By virtue of the above-described possibility of catching and arresting the permanent magnets in the preferred direction of orientation, in conjunction with the proper choice of the location of the rotational axis, it can be reliably achieved that a position of the respective magnets once adjusted will be retained even if the unit is subjected to strong accelerating forces or impacts. The permanent magnets need not necessarily have a rectangular cross section but may be given any other suitable design. For example, the rotatable permanent magnet bodies may have the shape of a cylinder or disc magnetized in the desired direction of magnetization. The permanent magnets may also consist of inserts embedded or held in bodies of non-magnetizable material such as synthetic plastic, or they may be mounted or connected with such supporting bodies in any other desired manner. The latter types of construction are preferable in cases where the permanent magnets consist of such extremely hard materials as aluminum-nickel-cobalt magnets of extremely high coercive force and remanence.

Data processing devices according to the invention, as described above are applicable for recording and reproducing various measuring and control data for computing, controlling or regulating operations, and for numerous other technological purposes. For example, in the automation of manufacturing processes, the various products to be processed can be identified by such magnetic memorizing and reproducing devices; a particular processing to be performed on a workpiece can thus be recorded, signaled or released. Consequently such magnetic devices are generally applicable for programming purposes. Devices of this type are further useful for automatically directing traveling goods along different conveyor paths depending upon given coded magnetizations assigned to the respective goods. Similar conveying problems are involved, for example, in the operation of mines where cars or mules are automatically controlled to travel on different rail lines depending upon different magnetic signals assigned to the respective cars.

It will be obvious to those skilled in the art, upon a study of this disclosure, that the invention may be given a variety of embodiments and applied for specific purposes, other than particularly illustrated and described herein, without departing from the essential features of my invention and within the scope of the claims annexed hereto.

I claim:

1. Magnetic data processing apparatus, comprising a data entering unit, a data storing unit and a data reproducing unit; said data storing unit having a carrier structure and having an ordered group of permanent magnets rotatably mounted individually on said carrier structure; said data entering unit having a number of magnetic field means of selectively variable individual magnetic orientation and capable of rotating said permanent magnets without mechanical contact when said entering unit and said storing unit are in proximity to each other, whereby said permanent magnets assume respective orientations jointly corresponding to the informative content exhibited by said data entering unit; said storing unit and said reproducing unit being movable relative to each other on a path including a position of mutual proximity; and said reproducing unit having an ordered group of transducer heads of which each is responsive to the field and magnetic orientation of one of said respective magnets when said reproducing unit and said storing unit are in proximity to each other.

2. In magnetic data processing apparatus according to claim 1, said permanent magnets having respective axes of rotation located at the gravity centers of said respective magnets.

3. In magnetic data processing apparatus according to claim 1, said reproducing unit being stationary, said data entering unit being stationary at a given location of the travel path of said storing unit so that said storing unit passes by said entering unit when traveling to said reproducing unit; and said entering unit having said magnetic field means grouped in an order corresponding to that of said permanent magnets of and storer unit.

4. In magnetic data processing apparatus according to claim 1, said magnetic field means of said data entering unit comprising an ordered group of permanent magnets adjustable to selected magnetic orientations.

5. Magnetic data processing apparatus, comprising a data entering unit, a data storing unit and a data reproducing unit; said data storing unit having a carrier structure and having an ordered group of permanent magnets rotatably mounted individually on said carrier structure; said data entering unit having a number of magnetic field means of selectively variable individual magnetic orientation, and capable of rotating said permanent magnets without mechanical contact when said entering unit and said storing unit are in proximity to each other whereby said permanent magnets assume respective orientations jointly corresponding to the informative content exhibited by said data entering unit; said storing unit and said reproducing unit being movable relative to each other on a path including a position of mutual proximity; and said reproducing unit having an ordered group of transducer heads of which each is responsive to the field and magnetic orientation of one of said respective magnets when said reproducing unit and said storing unit are in proximity to each other, each of said transducer heads having magnetizable core means with a field gap and having a Hall plate located in said gap, and current supply means connected to said Hall plates whereby each plate furnishes an output voltage whose characteristic is indicative of the magnetic orientation of the particular permanent magnet of the storer unit responded to by said Hall plate.

References Cited in the file of this patent

UNITED STATES PATENTS

| | | |
|---|---|---|
| 2,436,829 | Roth | Mar. 2, 1948 |
| 2,866,013 | Reis | Dec. 23, 1958 |